Figure 1:
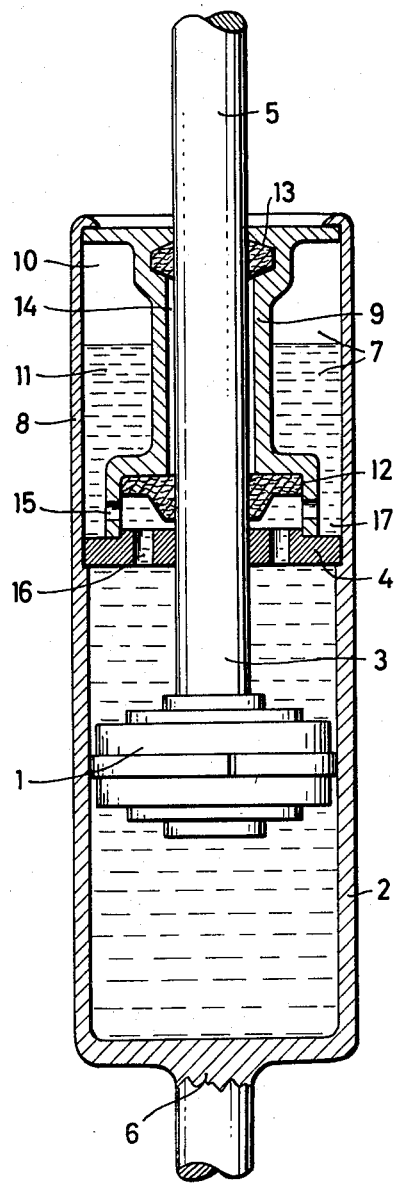

June 7, 1960  F. TUCZEK  2,939,696
TELESCOPIC HYDRAULIC SHOCK DAMPERS
Filed Nov. 28, 1955  2 Sheets-Sheet 2

INVENTOR.
F. Tuczek
BY
ATTYS.

United States Patent Office 2,939,696
Patented June 7, 1960

2,939,696

TELESCOPIC HYDRAULIC SHOCK DAMPERS

Franz Tuczek, Forster Str. 38, Eitorf (Sieg), Germany

Filed Nov. 28, 1955, Ser. No. 549,483

Claims priority, application Germany Dec. 6, 1954

7 Claims. (Cl. 267—64)

This invention relates to telescopic hydraulic dampers suitable for road and rail vehicles in which a piston on the end of a piston rod works in a cylinder filled with oil and for the purpose of compensating for the varying volume of the piston rod dipping into the liquid during movements of the piston, a chamber filled with air or other gas under substantial pressure is provided so that a spring action is obtained together with the actual damping action of the damper.

In the known dampers of this kind the compensating chamber is, for example, an actual part of the working cylinder. This has the disadvantage that mixing of oil and air takes place and the damping action is undesirably affected. In other constructions, the air chamber is separated from the working cylinder by means of a floating piston, a joint making piston, by elastic walls or in some other way. All these constructions have in common that air which in any event gets into the working cylinder charged with oil cannot be removed therefrom and collects in the upper part of the working cylinder. For this reason, it is usually necessary to arrange the end of the damper through which the piston rod projects at the bottom, so that the packing for the piston rod is always under oil and cannot run dry. The downwardly projecting piston rod presents undesirable conditions for protecting it against dirt and the impact of stones and the like.

The object of the invention is to provide a shock damper with an upwardly projecting piston rod, with automatic separation of air from the working cylinder and with a piston rod packing always supplied with oil. This is accomplished by providing a compensating chamber charged with oil and with air or other gas under high pressure above the piston rod packing and connecting the same with the working cylinder through an opening or openings immediately below the same. In this way no air can be retained in the working cylinder but is separated through the openings into the compensating chamber.

According to a development of the invention, the part of the working cylinder which carries the piston rod packing and through which the piston rod passes is made integral with the packing, which includes a joint making lip which surrounds and bears against the piston rod but elsewhere has clearance around the rod. In this case the part in question is made of polyamide or a material of similar properties, that is to say, a material which has good rubbing properties and which is adapted to press against the rod, both under its own elasticity and under the pressure reigning in the compensating chamber; it must be so elastic that it bears against the piston rod in such a way as to make a good joint but it must also be so strong that above the lip it is not pressed against the rod by the pressure in the compensating chamber. In this way not only is a joint made with the piston rod but a joint between the packing means and the part of the cylinder carrying it is no longer necessary. A particularly simple construction is obtained if this part of the casing of the damper also effects the guiding of the piston rod or is provided with an external extension which can be used for introducing the air or other gas into the compensating chamber or carries an extension which is constructed as a dust excluding lip.

In the known constructions having valves in the piston, damping forces are produced on the tension stroke as well as on the compression stroke. In the compression stroke the piston bears directly against a column of oil so that any desired damping force can be obtained within the limit of the mechanical strength of the parts. During the tension stroke the maximum damping force is controlled by the pressure in the compensating chamber, which exists above the piston. The maximum working pressure in a telescopic damper of known construction usually amounts in the compression stroke to 30 to 60 atmospheres or more. As the gas pressure in the compensating chamber in the damper according to the invention can easily be made 30 to 60 atmospheres or more, all the conditions necessary for the maximum damping forces during the tension stroke are possible. At the same time the danger of producing a vacuum beneath the piston, which could interfere with the satisfactory working of the damper, is avoided if the pressure difference acting across the piston is greater than the pressure in the compensating chamber.

The spring force in the damper according to the invention is equal to the product of the area of the piston rod and the pressure in the compensating chamber. It rises in the compression stroke with the movement of the piston rod and falls in the tension stroke with the outward movement of the piston rod. The gas volume of the compensating chamber is preferably made so small that a progressive spring action is obtained which suits the riding qualities of a vehicle very well indeed. For example, pressure of the air in the compensating chamber from the extreme outward position of the piston rod up to the extreme inward position of the rod may increase to double value, say from 30 to 60 atmospheres, if the displacement of the piston rod reduces the gas volume to, say, a half. The known gas laws here apply.

The compensating chamber has its lower part so far filled with oil that the streams of oil flowing in and out beneath the oil level cannot cause any mixing of the oil and air or other gas. Advantageously, provision of known kind is made to prevent mixing, for example, by the formation of a relatively narrow annular space into which the oil streams flow or by baffles or by such choice of the gas and oil that little or no mixing takes place.

The damper is charged with oil before assembly. To effect the charging with air or other gas a separate connection provided with a non-return valve may serve, or the packing of the piston rod may itself serve as a non-return valve, the air or other gas being forced in past it.

Figure 2:
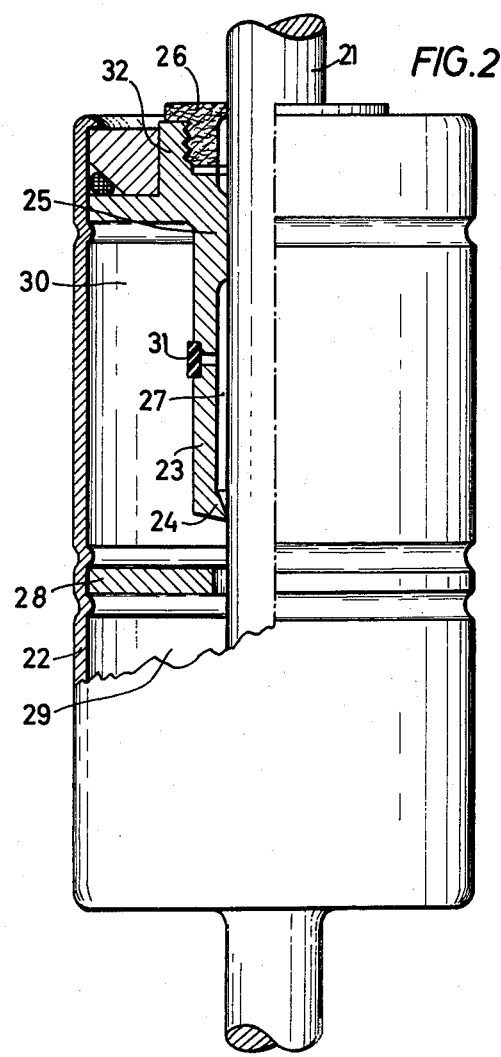

Two examples embodying the invention are diagrammatically illustrated in Figures 1 and 2 respectively of the accompanying drawings.

Figure 1 is an axial section of one form of the invention and Figure 2 is an elevation partly in axial section of a modified form of the invention.

In the example shown in Figure 1 a piston 1 provided with valves of known type, not shown, slides in a working cylinder 2 and is secured to the end of a piston rod 3 which is guided in a guide member 4. The upper end 5 of the piston rod and the bottom 6 of the working cylinder 2 serve for securing the damper to the parts with which it co-operates. A compensating chamber 7 is formed by an extension 8 of the working cylinder 2 and a casing part 9, and has its upper part 10 filled with air and its lower part 11 filled with oil. The part 9 carries at its lower end a piston rod packing 12 and at its upper end a dust excluding packing 13. A clearance space 14 between the piston rod 3 and the part 9 is free of pressure and can be filled with a lubricant for lubricating the packing 13 or the packing 12, if the actual joint-making lip of the packing 12 so strongly wipes the oil off the rod that the back of the packing runs dry.

The oil in the compensating chamber is in communication with the oil in the working cylinder 2 through openings 15 directly below the rod packing 12 and openings 16 in the guide member 4. The annular space 17 which is formed by the construction of the parts also serves as a space in which the streams of oil flowing through the openings 15 can reduce their speed or come to rest.

In Figure 2, a piston rod 21 carries at its lower end a piston not shown which works in a working cylinder 22. The casing part 23 which corresponds to the part 9 of Figure 1 has at its lower end an integral joint-making lip 24 which preferably has a conical internal bore and a very narrow portion in contact with the rod, and at the upper end a rod guiding part 25. A packing 26 is provided with a dust excluding lip to hinder the entry of dirt into the chamber. The space 27 between the part 23 and the rod 21 is filled similarly to the space 14 of Figure 1 with a lubricant. A disc 28 serves as an abutment for the piston when the piston rod is pulled outwardly and also as a partition between the working chamber 29 and the compensating chamber 30. Thus the disc 28 serves a similar function to the part 4 of Figure 1. The casing 23 is provided externally with a socket 32 having a thread into which a charging connection can be screwed. Charging is effected before the packing 26 is screwed in and the pressure is built up through the guide part 25 and space 27 from which the air is displaced through a non-return valve here constituted by a rubber ring 31 stretched over holes in the part 23, into the compensating chamber.

Various modifications in the construction can be made. Thus in the construction of Figure 2, instead of the lip 24 having a narrow area shaped to make surface contact with the piston rod 21, it can be shaped to a sharp edge, the pressure outside being sufficient to press it into adequate surface contact with the rod. Other changes can also be made. For example, the disc 28 in Figure 2 could be of the same form as the guide member 4 of Figure 1 and there may also in this construction be used a similar annular wall to that having the apertures 15 in Figure 1. Again, in the construction of Figure 1 the member 4 could be replaced with a disc similar to the disc 28 of Figure 2, so that the oil instead of passing through holes 16 passes through the annular space between the rod and the hole in the centre of the disc.

I claim:

1. A telescopic hydraulic shock damper comprising a working cylinder, a piston operable in the cylinder, a piston rod carrying the piston and extending upwardly out of the cylinder, means effecting a seal between the rod and the cylinder, a closed compensating chamber surrounding and extending above the sealing means but communicating below the sealing means with the working cylinder, a hydraulic damping liquid filling the working cylinder and the lower part of the chamber up to a level above said sealing means, gas under high pressure filling the remainder of the chamber, a casing part forming part of the closure of the compensating chamber and extending along the piston rod, the inner end of the casing part having an integral sealing lip engaging the rod and which lip constitutes the means effecting the seal, and a guide on the casing part for the piston rod with the casing part between the guide and the lip being provided with a clearance around the piston rod for the reception of a lubricant.

2. A damper as set forth in claim 1 wherein said casing part is of an elastic non-metallic material, such as polyamide, which yields sufficiently under pressure for the lip to make a good joint against the rod without the part having clearance round the rod being pressed against it.

3. A damper as set forth in claim 1 wherein said casing part has an outer end portion in the form of a dust excluding lip.

4. A damper as set forth in claim 1 wherein apertures in the casing part lead from said clearance space into said compensating chamber, said casing part also including a rubber ring covering the outer ends of said apertures, thereby to serve as a non-return valve when gas under pressure is forced into the compensating chamber.

5. A damper as set forth in claim 1 also including an abutment for the piston which checks the outward movement of the piston before the piston can strike said lip.

6. A damper as set forth in claim 1 also including a partition separating said working cylinder and said compensating chamber, said partition being located to act as a stop for said piston on the outward stroke before the piston can strike said lip, said partition having an aperture therethrough permitting throttled flow of liquid between said cylinder and said compensating chamber.

7. A telescopic hydraulic shock damper comprising a working cylinder, a piston operable in the cylinder, a piston rod carrying the piston and extending upwardly out of the cylinder, means effecting a seal between the rod and the cylinder, a closed compensating chamber surrounding and extending above the sealing means and communicating below the sealing means with the working cylinder, a hydraulic damping liquid filling the working cylinder and the lower part of the chamber up to a level above said sealing means, said piston having through passages therein for the liquid serving as motion dampers, gas under high pressure filling the remainder of the chamber and a casing part forming part of the closure of said compensating chamber and extending along said piston rod, the inner end of said casing part having an integral sealing lip contacting said rod and which constitutes said sealing means.

References Cited in the file of this patent

UNITED STATES PATENTS

| 433,657 | Riegel | Aug. 5, 1890 |
| 1,918,699 | Gruss | July 18, 1933 |
| 2,643,112 | Smith | June 23, 1953 |
| 2,708,109 | Taylor | May 10, 1955 |
| 2,721,074 | Bourcier de Carbon | Oct. 18, 1955 |
| 2,774,446 | Bourcier de Carbon | Dec. 18, 1956 |

FOREIGN PATENTS

| 299,670 | Great Britain | Nov. 1, 1928 |
| 948,067 | France | Jan. 24, 1949 |
| 1,046,291 | France | July 8, 1953 |
| 1,069,114 | France | Feb. 10, 1954 |
| | (Corresponding British Patent 748,469, May 2, 1956) | |
| 1,090,391 | France | Oct. 20, 1954 |